(12) United States Patent
Banks et al.

(10) Patent No.: US 6,360,712 B1
(45) Date of Patent: Mar. 26, 2002

(54) SELF-ALIGNING AND LOCKING MOUNT FOR ENGINE ACCESSORY

(75) Inventors: Thomas M Banks, Ypsilanti; Kenneth W Wheat, Dearborn; Vem L Chuang, Bloomfield Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/563,762

(22) Filed: May 1, 2000

(51) Int. Cl.$^7$ ................................................ F02B 77/00
(52) U.S. Cl. ............................. 123/198 R; 123/195 A
(58) Field of Search ..................... 123/195 R, 195 A, 123/195 C, 198 R, 198 C; 248/674, 675

(56) References Cited

U.S. PATENT DOCUMENTS

| | | |
|---|---|---|
| 3,018,667 A | 1/1962 | Spietz |
| 3,362,243 A | 1/1968 | Ferguson |
| 3,730,147 A | 5/1973 | Buchwald |
| 4,633,828 A | 1/1987 | Steele |
| 5,065,713 A | 11/1991 | Seats |
| 5,938,169 A * | 8/1999 | Ogawa et al. ............... 248/674 |
| 6,098,950 A * | 8/2000 | Zupan et al. ................ 248/674 |

\* cited by examiner

*Primary Examiner*—Willis R. Wolfe
*Assistant Examiner*—Hai Huynh
(74) *Attorney, Agent, or Firm*—Edwin W. Bacon, Jr.

(57) ABSTRACT

A specialized mounting arrangement for an accessory such as an engine driven air conditioner compressor to an engine is utilized featuring a pair of press fitted bushings in a pair of arms of the mount and a single bolt extending therethrough. The arms of the mount assembly are constructed so that they straddle portions of an anchor member attached to the engine. A connector bolt is inserted through one bushing in one arm of the mount and then thorough a passage in the anchor member, and next into engagement with internal threads carried by the other bushing which his carried by the other arm of the mount. Rotation of the bolt moves the bushings toward one another and against the ends of the anchor member to clamp the anchor and thus the accessory therebetween. This clamping construction permits the accessory and mount to be adjusted axially relative to the bold so the accessory can be aligned relative to the engine drive arrangement before the accessory is finally affixed to the engine in a non-adjusting fashion.

9 Claims, 4 Drawing Sheets

SELF-ALIGNING AND LOCKING MOUNT FOR ENGINE ACCESSORY

FIELD OF THE INVENTION

This invention relates to mounts for engine accessories and more particularly to a new and improved self-aligning and self-locking mount with adjustable clamping bushings for securely attaching an engine accessory to the engine.

DESCRIPTION OF RELATED ART

Prior to the present invention various bracket constructions have been devised and utilized to mount automotive accessories to the engine so that they can be driven thereby and are accessible for service. Examples of such prior art are found in the following U.S. Pat. No. 3,730,147 to Buckwald for Engine Accessory Arrangement; U.S. Pat. No. 5,065,713 to W. Seats for Mounting Brackets For Mounting Engine Accessories; and U.S. Pat. No. 4,633,828 to L. Steele for Adjustable Polar Point Mount. While these prior art arrangements provide various constructions for accessory mounting and generally meet their objectives, they do not meet new and higher standards for attaching an accessory at a first point directly to the engine and then securing the accessory to the engine by multiple anchors. Moreover and in contrast to the present invention, the prior art mounting constructions are not readily adaptable for accommodating relatively large tolerances common in mass produced components. Also, they do not conveniently and rigidly anchor the accessory at multiple attachment points to the engine so that the accessory is positioned in a predetermined desired position for subsequently receiving relatively great torque inputs such as by a drive belt driven by the engine crankshaft. Furthermore, the prior constructions do not provide for material savings of engine compartment space and for self-locking and self-aligning with respect to the supporting structure.

BRIEF SUMMARY OF THE INVENTION

In vehicle applications, it is often desirable to mount accessory components such as the air conditioner compressor directly to the engine. Because engines have been downsized and engine components have become more cramped, the need has arisen to mount engine driven components by new arrangements. Preferably, the arrangement should space the accessory close to the engine and in an accessible location to enhance service as well as to effectively utilize limited engine compartment space. The new and improved mounting unit of this invention meets such needs and requirements in one straightforward unit. More particularly, the mounting unit of this invention incorporates two spaced arm portions with apertures therethrough in which a pair of press fitting bushings extend. A single fastener such as a threaded bolt extends through the two bushings and through a corresponding passage in the accessory which is positioned between the two arm portions. Preferably, one bushing is internally threaded to mesh with threads on the bolt and provision is made to eliminate rotation of the bushing and thus a need for an assembly tool such as a wrench to prevent rotation of the bushing during assembly. This invention can be used to mount a variety of components particularly where additional remote mountings are used in conjunction with the mounting provided by this invention.

It is a feature, object and advantage of this invention to provide a new and improved mount assembly to stabilize the connection of an accessory such as an air conditioner compressor to the vehicle engine. The mount assembly is self-locking and self aligning and is secured to the accessory. The mount assembly employs non-rotatable, axially sliding bushings that adjust axially to accommodate tolerance stack up variations between the arms of the mount and the corresponding attachment structure of the accessory. Turning of a connecting bolt extending through the mount arms and the attachment structure creates a force causing axial movement of the bushings together. This movement clamps and secures the accessory to the bushings and attachment structure. Due to the action of the sliding bushings, no undue axial clamp force is imparted to the arms of the mounting assembly or frame which could result in damaging the arms.

BRIEF DESCRIPTION OF THE DRAWINGS

These and other features objects and advantages of the present invention will become more apparent from the following detailed description and drawings in which:

FIG. 3 is an enlarged pictorial view of a first bushing used in the aligning and locking mount assembly of FIGS. 2 and 2a; and FIG. 4 is an enlarged pictorial view of a second bushing used in the aligning and locking mount assembly of FIGS. 2 and 2a.

DETAILED DESCRIPTION OF THE INVENTION

Figure 1:
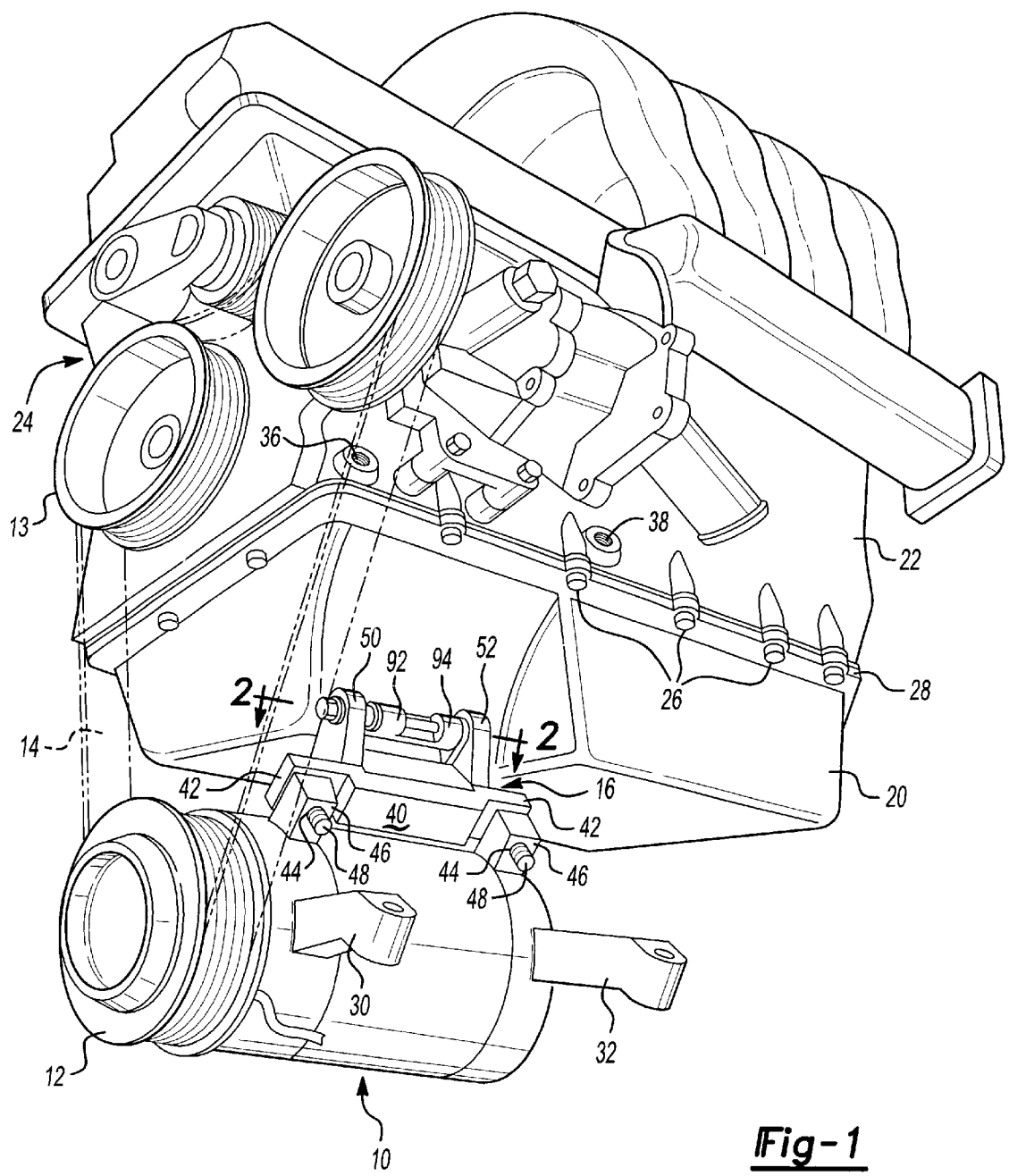
FIG. 1 is a pictorial view of a bottom portion of an internal combustion engine with an engine driven air compressor mounted thereto.

Turning now in detail to the drawings there is shown in FIG. 1 an air conditioning compressor 10 having an input drive pulley 12 on the outboard end thereof conventionally driven by the engine crankshaft mounted pulley 13 through a serpentine drive belt 14. The compressor 10 is operatively connected to the engine by a lower mount assembly 16. Specifically, the compressor 10 is attached by assembly 16 to the oil pan 20 of the engine. The oil pan 20 in turn is attached to the engine block 22 of the vehicle engine 24 by screws 26. A gasket 28 is interposed between the oil pan 20 and the engine block 22 to effect fluid sealing between these two components.

Figure 5:
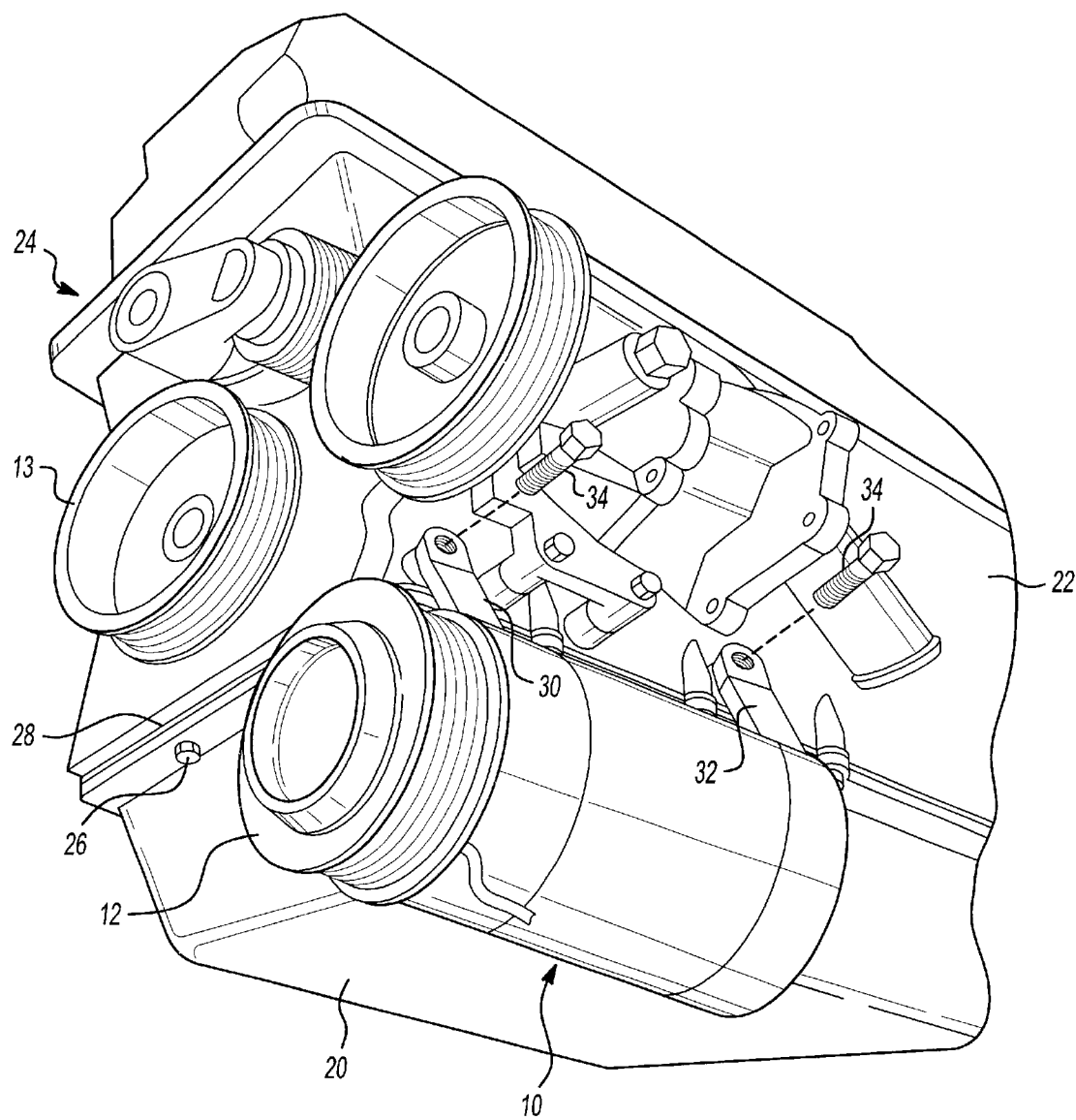
FIG. 5 is a pictorial view similar to FIG. 1 but showing the attachment of upper arm portions of the air conditioning compressor to the engine.
Figure 6:
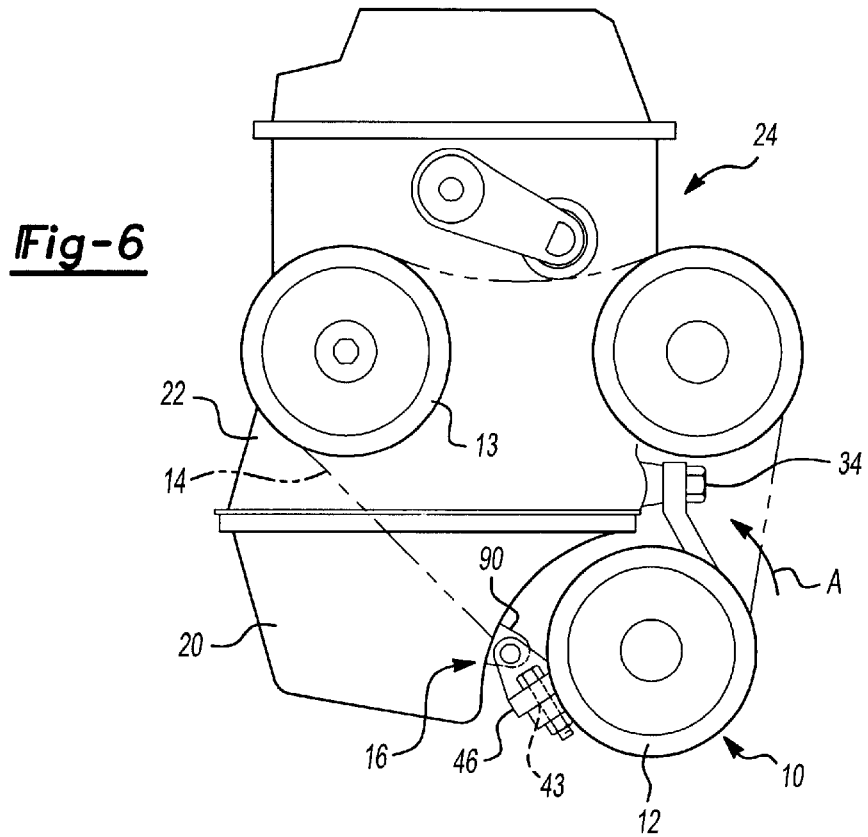
FIG. 6 is an end view of the engine of FIG. 1 illustrating another view of the attachment of the air conditioning compressor to the engine by the mounting assembly and by the upper attachment arms.

As seen in FIGS. 5 and 6, a connection of the compressor 10 to the engine in addition to that by the lower mount assembly 16 to oil pan 20 is carried out by a direct attachment of a pair of laterally spaced upper arms 30 and 32 of the compressor by means of fastener screws 34. These upper arms 30, 32 extend outwardly from opposite end portions of the housing of the compressor 10 and are attached at their distal ends by the screws 34. As shown in FIG. 1, the screws 34 are adapted to thread into the internally threaded and laterally spaced bores 36 and 38 formed in the engine block 22 at remote points from the lower mount assembly 16. Because the upper and lower connections of the compressor 10 are to different components of the engine (oil pan 20 and engine block 22) and since these different components are likely to be furnished by different suppliers, perhaps from more than one country, the design of the lower mount assembly is required to automatically compensate for limit stack (quantity production variation in parts tolerance) between the engine components and also between oil pan positioning and the anchor points by which the lower mount is attached to the accessory.

In a preferred embodiment, the lower mount assembly 16 has a generally rectilinear attachment or base frame 40 which has a pair of laterally extending attachment wings 42 located on opposite ends of the base 40. As seen in FIG. 6, wings 42 have aligned fastener openings 43 formed therein which align with threaded openings 44 formed in corresponding radically extending lug portions 46 of the housing of the compressor 10. Threaded fasteners 48 extend through the openings 43 in the wing portions and are threaded into the corresponding openings 44 in the lug portions 46. This securely couples the mount assembly 16 to compressor 10.

Figure 2:
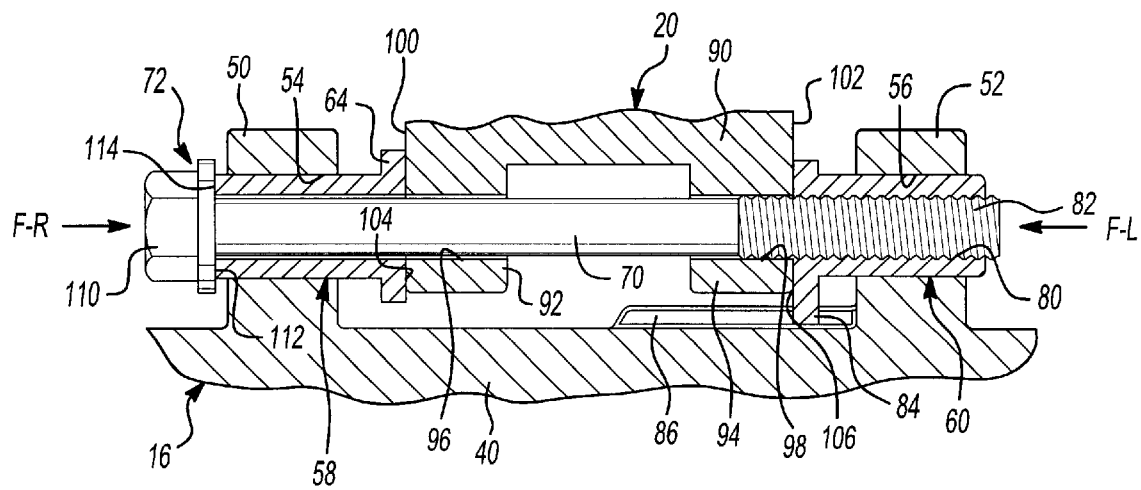
FIG. 2 is an enlarged cross sectioned view of a part of an aligning and locking mount assembly attaching the air conditioner compressor to the engine taken generally along sight lines 2—2 of FIG. 1.
Figure 2A:
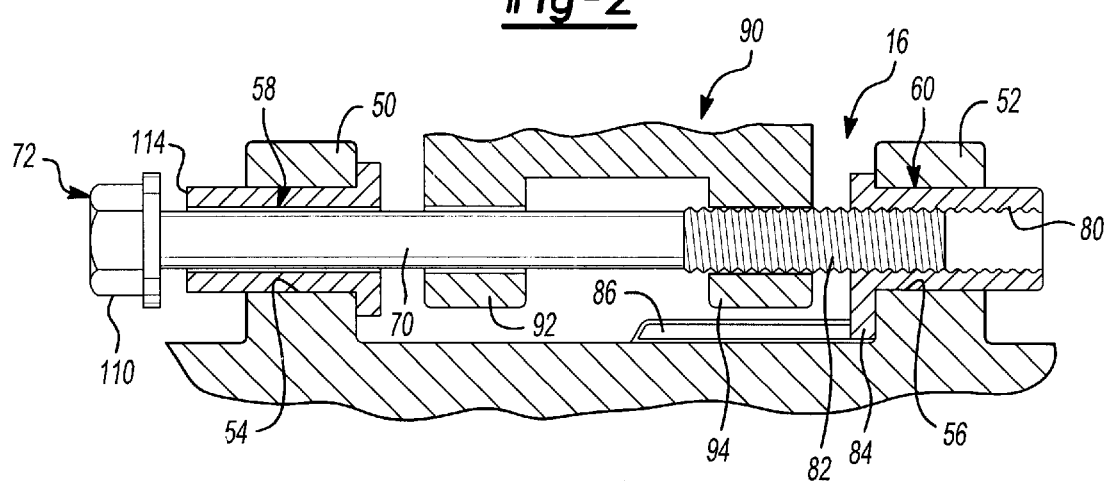
FIG. 2a is a sectioned view of part of the mounting assembly shown in FIG. 2 in which the connection bolt is in its pre-assembled position of the mount assembly.

A pair of laterally spaced apart attachment arms 50, 52 of base frame 40 project away from and upwardly in FIG. 1. As seen in FIGS. 2, 2A, the arms 50, 52 of base frame 40 have cylindrical and axially aligned through-passages 54, 56. These passages respectively receive split bushings 58 and 60 which are press fitted in the passages 54, 56. The bushings are sized to frictionally fit in their passages so that they will not turn after being press fitted therein. Bushings 58, 60 may be conveniently made from powdered metal.

Figure 3:
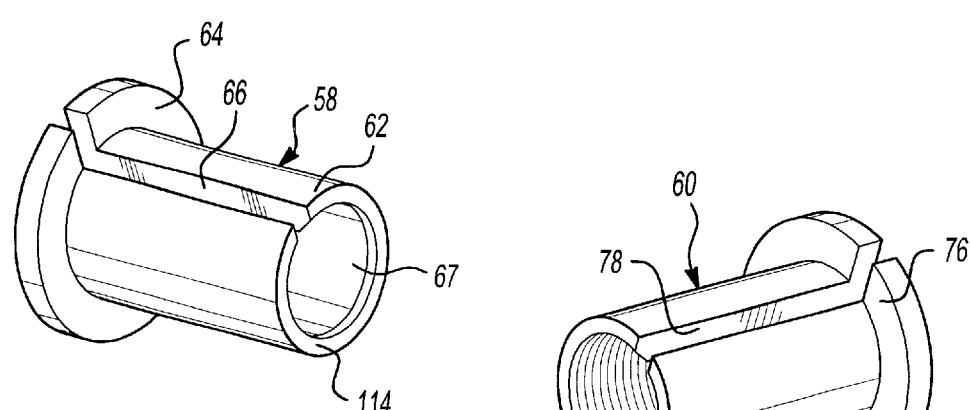
Figure 4:
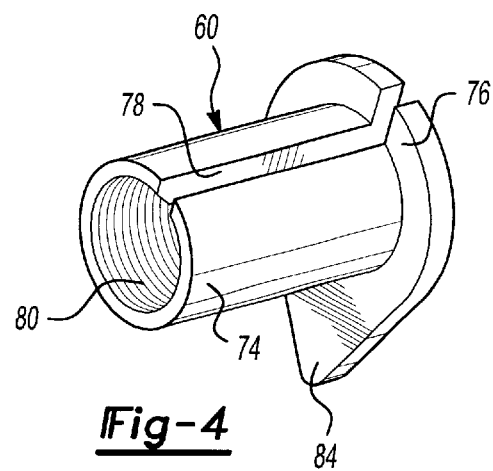

Details of preferred bushings 58, 60 are best shown in FIGS. 3 and 4. Bushing 58 has a generally cylindrically and tubular body 62 which extends axially from an enlarged and circular head portion 64. The body 62 and head portion 64 are split lengthwise by a longitudinal slit 66 allowing it to readily accommodate a range of diameters of passages 54. When the bushing 58 is inserted into the passage 54, the tubular body 62 is squeezed to effect a degree of closure of the slit 66. The recovery force exerted by body 62 in attempting to recover its relaxed configuration will frictionally hold the bushing in the passage 54 and inhibit rotate. The inner diameter cylindrical surface 67 of bushing 58 is preferably cylindrical and smooth and has a dimension sufficient to accommodate passage of the cylindrical shank 70 of a connector bolt 72 therethrough as seen in FIGS. 2 and 2A.

The other bushing 60 is generally like bushing 58 and has a cylindrical tubular body 74 and a contact head portion 76. As with bushing 58, the bushing 60 has a longitudinal slit 78 therein to create a tight press fit of the bushing in various diametered openings such as passage 56. Thus bushing 60 is held in passage by its natural recovery force exerted outwardly against the walls of the passage. In addition, the body 74 of bushing 60 is internally threaded with a helical thread 80 for meshing with a corresponding thread on the end portion 82 of the bolt 72.

The head portion 76 of bushing 60 also has a radially outwardly extending protuberance or tab 84. Tab 85 is designed to physically contact a raised stop 86 extending upward from the upper surface of the base 40 of the lower mount 16. This contact prevents rotation of the internally threaded bushing 60 as the bolt 72 is rotated from the pre-assembly position of FIG. 2A to the assembled position of FIG. 2. As attachment bolt 72 threads into the threaded opening 80 of bushing 60, the bushings 58, 60 are axially moved toward one another into a position where the head portions 64, 76 engage the compressor housing.

In this embodiment, the oil pan 20 is an aluminum casting formed with an integral and projecting accessory anchor portion 90. As best seen in FIG. 2, the anchor portion 90 includes a pair of laterally spaced and outwardly projecting attachment arms 92, 94. The arms 92, 94 have aligned openings 96, 98 of sufficient diameter to allow the shank 70 of bolt 72 to pass readily therethrough. The outboard side surfaces 100, 102 of arms 92, 94 are flattened for optimizing physical contact with the correspondingly flattened outer surfaces 104, 106 on the bushings 58, 60 when in a fully clamped and locked position assembled condition.

Preferably the accessory mount assembly 16 is pre-installed on the accessory such as the compressor so that its laterally spaced arms 50, 52 can be conveniently positioned to straddle the arm portions 92, 94 of the anchor portion 90 of the oil pan 20. In the pre-assembled condition, bushings 58 and 60 are inserted into the passages 54,56 and separated by a sufficient distance to accommodate a wide tolerance in the dimension of the anchor portion 90 of the oil pan. After the openings in the arms 92, 94 of the anchor portion 90 and the openings in the arms 50, 52 of the mount 16 are aligned, bolt 72 is inserted through the first bushing 58, the openings 96 and 98 in the arms 92 and 94 of the anchor 90, and then into threaded engagement with the bushing 60. This initial pre-assembly, pre-attachment connection is illustrated in FIG. 2A.

The enlarged polygonal head 110 of the bolt is turned by suitable tooling, such as a torque wrench to advance the bolt 72 into bushing 60. When the flattened side 112 of the bolt head engages the end 114 of bushing 58, the resultant inwardly directed force F of the bolt on the bushing 58 moves it to the right in FIG. 2A. Meanwhile, the threaded connection of bolt 72 and bushing 60 creates an inwardly directed pulling force F-1 on bushing 60. These forces cause movement of the bushings 58, 60 toward one another. While the bushings are moved toward one another, they are fixed from rotation in their associated passages by the press fit. Also, a radial expansion force from the entry of the screw section of the bolt into the corresponding threaded interior of the bushing 60 may cause even greater gripping force between bushing 60 and arm 52 to further secure this bushing against rotation.

The inward sliding movements of the bushings along the shank 70 of the bolt 72 continues until the side surfaces 100 and 102 of arm portions 92 and 94 are engaged by the end portions 64, 76 of bushings 58, 60. The forces on bushing 58, 60 as directed onto the surfaces 100, 102 of the anchor portion 90 further keep the bushings from rotation.

The above described action of the bushings results in positioning of the structure and self-alignment of the anchor portion 90 between the spaced arm portions 50, 52 of the mount assembly 16. Now with the compressor 10 fixed to the lower mount assembly, the compressor can be positioned so that it is fixed in a desired axial operating position in which the outboard pulley portion 12 is aligned with the associated pulley 13 on the engine's crankshaft. This makes for a smooth transfer of driving power through the serpentine belt 14.

Moreover, with the above described sliding clamping and locking construction, the mount's arm portions 50, 52 are not subjected to bending forces which might fractured them or otherwise damage them. This is because the clamping forces are routed through the bushings 58, 60 and onto the opposing side surfaces 100, 102 of the anchor arms 92, 94. The clamping and locking action is accomplished after the initial connection of the accessory mount 16 to the anchor portion 90. As illustrated by means of arrow "A" in FIG. 6, the compressor 10 is then pivoted counterclockwise about the pivot provided by bolt 72 to an operating position as shown in FIGS. 5 and 6. The compressor 10 is subsequently firmly attached to the engine block 22 by fasteners 34 extending through apertures in upper arms 30, 32 and into treaded openings 36, 38. With the compressor 10 secured at its upper arms 30, 32, the bolt 72 can then be tightened to complete the mounting of the compressor 10. As the bolt 72 is rotated, the bushing 60 is inhibited from rotation in passage 56 by interaction between tab 84 and raised portion 86.

Figure 7:
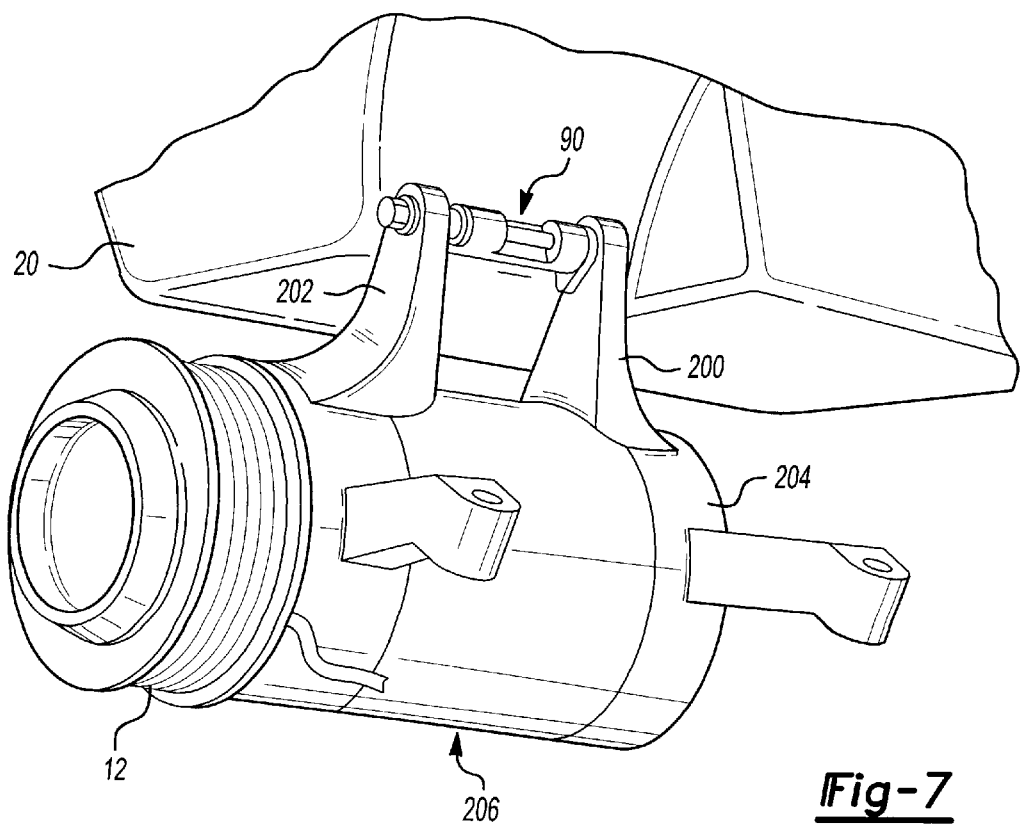
FIG. 7 is a pictorial view of another embodiment of the invention illustrated by an accessory with integral mounting attachment arms that incorporate the features of the separate aligning and locking mount component shown in FIGS. 1–6.

FIG. 7 illustrates a modification of the invention in which the locking mount assembly includes laterally spaced arm portions 200, 202 which are integrally formed from the accessory or compressor housing 204. The associated bushings and other componentry of the mount arrangement remain substantially the same as in the previously described embodiment. If desired, these bushings could be keyed or splinted into the arms 200, 202 to allow their clamping action while preventing their rotation.

Many modification and variation of the present invention can be contemplated in light of the disclosure of preferred embodiments of this invention. It is therefore to be understood, that the invention may be practiced other than as specifically described. The embodiments of the invention in which an exclusive property or privilege is set forth as follows:

What is claimed is:

1. A self-aligning and locking mount for operatively mounting an accessory to support structure associated with an internal combustion engine and having a bolt passage way therethrough comprising first and second laterally spaced connector arms, said connector arms having first and second aligned bolt openings extending therethrough, first and second generally cylindrical bushings respectively mounted against turning in said first and second openings, said second bushing being internally threaded, a threaded bolt operatively extending through said first bushing and then through the passage way in the support structure and further into threaded connection with said internally threaded second bushing, said bolt having an outboard end portion for operatively receiving a torquing tool for turning said bolt to effect the resultant axial movement of said bushings in said arms toward one another to engage and securely clamp the support structure therebetween.

2. The self aligning and locking mount of claim 1 wherein said bushings are press fitted in the openings in said arms and wherein each of said bushings has a generally cylindrical body and a contact head for engaging the support structure located at the inner side of each of said connector arms.

3. The self aligning and locking mount of claim 2 wherein the contact head of each of said bushings is generally circular and is larger in diameter than the diameter of said cylindrical body.

4. The self aligning and locking mount of claim 3 wherein the contact head of said second bushing has a radially extending protuberance for contact with the support structure to inhibit the turning of said second bushing in said opening associated therewith.

5. The self aligning and locking mount of claim 3 wherein said second bushing radially expands in response to the threading of said bolt therein to radially expand the second bushing to increase the load frictionally maintaining the second bushing in said second opening.

6. A self aligning and locking mount for securing an accessory to a fixed anchor with an attachment bolt opening therethrough associated with an internal combustion engine for a vehicle so that said accessory can be driven by said engine comprising a base portion for secure attachment to the accessory, a pair of laterally spaced attachment arms projecting from said base portion, a through passage in each of said arms axially aligned with one another, a bushing fitted into each of said through passages so that they are inhibited from turning therein, a first of said bushings having a cylindrical surface therein, a second of said bushings having an internal helical screw thread therein, an attachment bolt having a threaded end for insertion through a first of said bushings and then through the bolt opening in said fixed anchor and further into threaded connection with said second bushing, said attachment bolt having a head thereon configured to accept a torquing tool so that said bolt can be turned to thereby advance the bolt so that said head contacts the outer end of the first bushing and said helical threads of said bolt and said second bushing interact to thereby respectively exert opposing inwardly directed forces on said bushings so that they axially move in opposing directions to clamp said fixed anchor therebetween.

7. The construction of claim 6 wherein said bolt bushings are cylindrical and are press fitted into said aligned openings in said arms and one of said bushings is formed with a radial protuberance for contacting a surface on said base to prevent said bushing from turning when said threaded bolt is threaded therein.

8. The construction of claim 6 wherein said accessory has upper accessory attachment arms remote from said mount for connection with said engine and wherein said bolt provides a lower pivot for said accessory allowing said accessory to be turned with respect to said engine to a predetermined position adjacent to the engine allowing said upper attachment arms to be fastened to said engine and said bolt of said mount to be subsequently advanced to lock said accessory in operating position on said engine.

9. A self aligning and locking mount for securing an accessory to a fixed anchor with contact sides and with an attachment bolt opening therethrough associated with an internal combustion engine for a vehicle so that said accessory can be driven by said engine comprising a base portion for secure attachment to the accessory, a pair of laterally spaced attachment arms projecting from said base portion, a through passage in each of said arms axially aligned with one another, a bushing press fitted into each of said through passages so that they are inhibited from turning therein, each of said washings having a generally cylindrical body and an enlarged contact head on one end thereof, a first of said bushings having a cylindrical surface therein, a second of said bushings having an internal helical screw thread therein, an attachment bolt having a threaded end for insertion through a first of said bushing and then through the bolt opening in said fixed anchor and further into threaded connection with said second bushing, of a width larger than the diameter of said body of said bushing and said attachment bolt having a head configured to accept a torquing tool so that said bolt can be turned to thereby advance the bolt so that said head contacts the outer end of the first bushing and said helical threads of said bolt and said second bushing interact to thereby respectively exert opposing inwardly directed forces on said bushings so that they are axially moved in opposing directions to effect the engagement of said contact heads of said bushings with the contact sides of said anchor to thereby clamp said fixed anchor therebetween.

* * * * *